United States Patent [19]

Sasaki et al.

[11] Patent Number: 5,057,813
[45] Date of Patent: Oct. 15, 1991

[54] OIL LEVEL SENSOR FOR AN INTERNAL COMBUSTION ENGINE

[75] Inventors: Asao Sasaki, Noda; Yousuke Kubota, Kita, both of Japan

[73] Assignee: Fuji Jukogyo Kabushiki Kaisha, Tokyo, Japan

[21] Appl. No.: 518,804

[22] Filed: May 4, 1990

[30] Foreign Application Priority Data

| May 25, 1989 | [JP] | Japan | 1-32087 |
| May 25, 1989 | [JP] | Japan | 1-60569[U] |
| May 25, 1989 | [JP] | Japan | 1-60570[U] |
| May 25, 1989 | [JP] | Japan | 1-132088 |
| Jul. 4, 1989 | [JP] | Japan | 1-79348[U] |

[51] Int. Cl.$^5$ ............................................. G01F 23/22
[52] U.S. Cl. .................. 340/450.3; 73/304 R; 340/620
[58] Field of Search ............ 73/304 R, 308; 340/620, 340/450.3

[56] References Cited

U.S. PATENT DOCUMENTS

| 3,910,118 | 10/1975 | Schittek et al. ............... 73/304 R |
| 4,322,713 | 3/1982 | Duck et al. .......................... 340/620 |
| 4,506,258 | 3/1985 | Charboneau et al. ......... 340/450.3 |
| 4,638,291 | 1/1987 | Puscasu ......................... 73/304 R X |
| 4,654,646 | 3/1987 | Charboneau ................ 340/450.3 X |
| 4,849,739 | 7/1989 | Loiacono ...................... 73/304 R X |
| 4,949,069 | 8/1990 | Wilson ........................... 340/620 X |

FOREIGN PATENT DOCUMENTS 62-93417 4/1987 Japan .
62-26379 2/1987 Japan .

*Primary Examiner*—Daniel M. Yasich
*Attorney, Agent, or Firm*—Martin A. Farber

[57] ABSTRACT

An oil level sensor has a cylindrical hollow sensor body and an elongated inner electrode provided in the sensor body at a distance from the inner wall of the sensor body. The sensor body is made of conductive resin including carbon particles.

The sensor body is electrically connected to the elongated inner electrode and to a control unit for indicating a shortage of the fluid. The control unit is a shielded wire comprising a lead wire connected with the elongated inner electrode and a wire shield connected with the cylindrical hollow sensor body. The elongated inner electrode has a flange at a base portion thereof so as to be firmly secured in the inner electrode guide and an insulator sleeve plugged into the cylindrical hollow sensor body, whereby the flange is held between the inner electrode guide and the insulator sleeve.

3 Claims, 7 Drawing Sheets

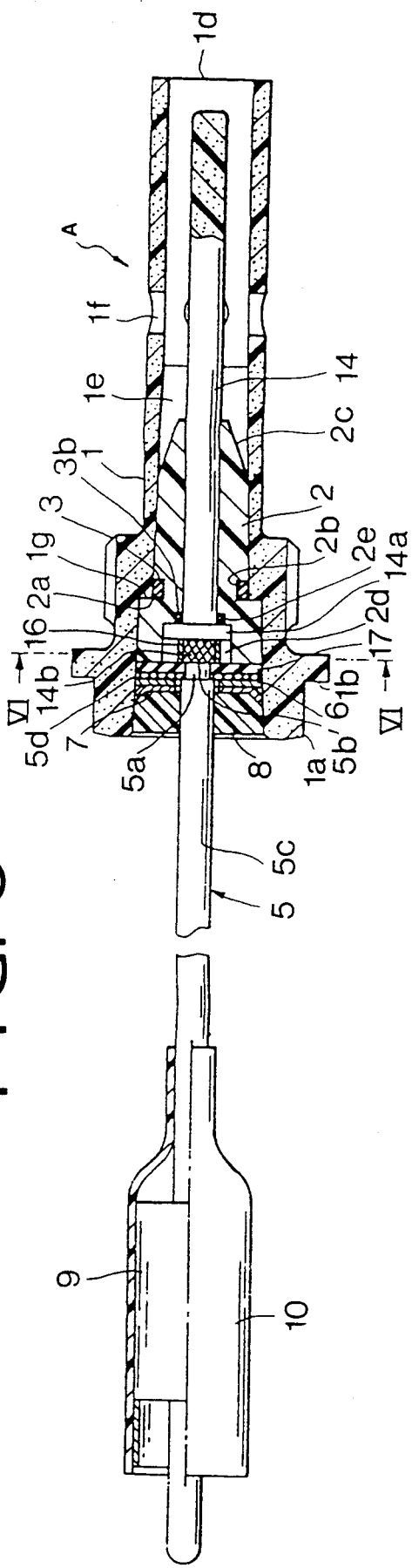
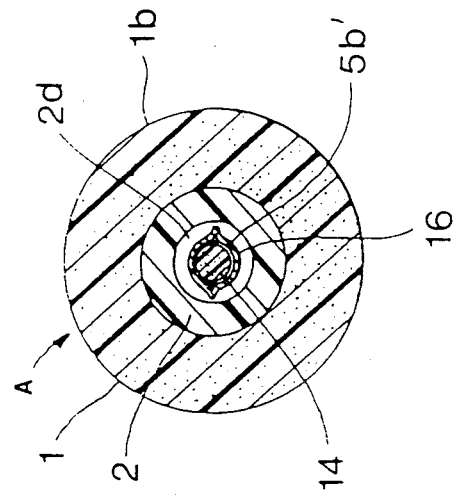
FIG. 5
FIG. 6

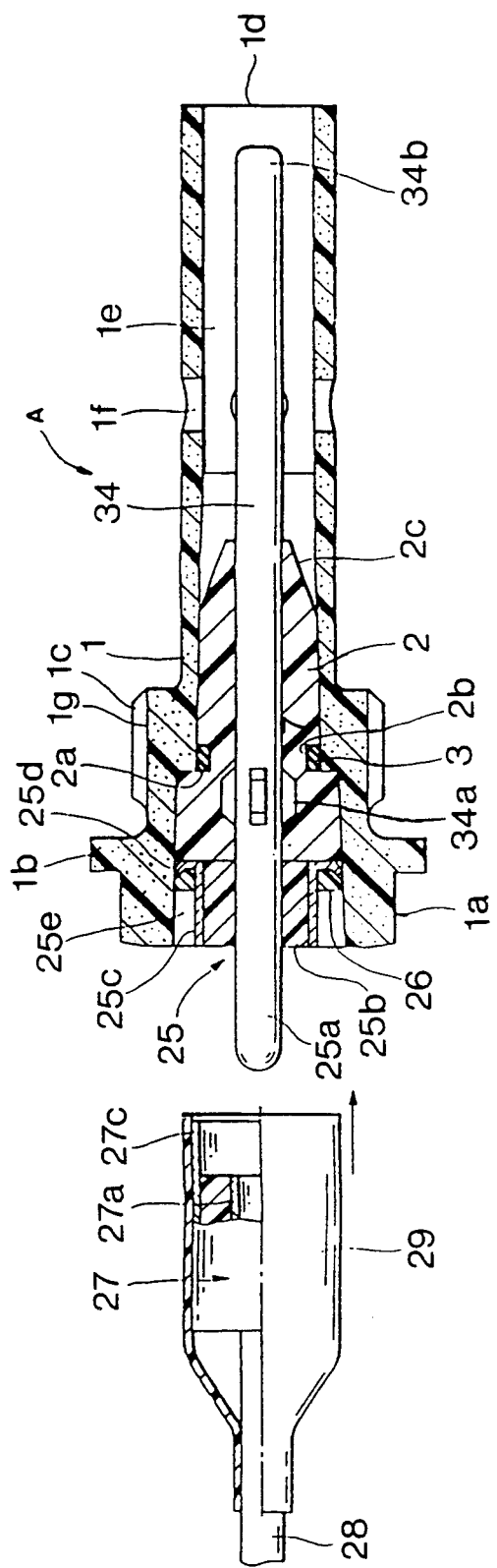
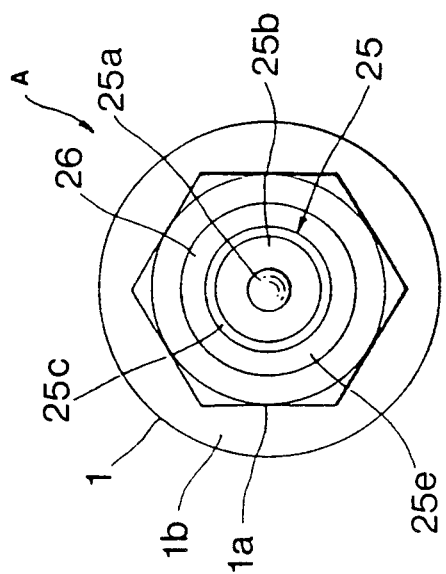
FIG. 9
FIG. 10

OIL LEVEL SENSOR FOR AN INTERNAL COMBUSTION ENGINE

BACKGROUND OF THE INVENTION

The present invention relates to an oil level sensor for detecting the level of lubricating oil in an internal combustion engine.

In an industrial or a utility engine, if the engine is operated without checking a shortage of the lubricating oil, the engine is damaged.

Consequently, an oil level sensor is provided for monitoring the level of the lubricating oil while operating. When the oil sensor detects a level of the oil lower than a set level, the engine is stopped or an alarm lamp is turned on to prevent the engine from becoming damaged.

Japanese Patent Applications Laid-Open 62-93417 and 62-26379 disclose oil sensors employed with an oil pressure switch and a reed switch, respectively.

The oil sensor employed with the reed switch consists of various components such as a float and a magnet in addition to the reed switch, so that the oil sensor is complicated in construction. Further, the sensor must be assembled in a crankcase before assembling the engine.

The oil sensor employed with the oil pressure switch can not be used for an engine without an oil pump.

To the contrary, a fluid sensor for detecting an amount of fluid by measuring a resistance of the fluid is known.

The fluid sensor comprises a center electrode and an outer electrode surrounding the center electrode at a predetermined distance. The fluid sensor detects the volume and concentration of the fluid, and other items in accordance with variations of the resistance between the center electrode and the outer electrode.

The fluid sensor is made of a metallic material having a high electric conductivity in order to detect the variation of the resistance.

The sensor body is made by die casting. It is necessary to provide a draft taper for forming a cylindrical space in the sensor body in which the center electrode is inserted. As a result, the cylindrical space must be tapered, so that the distance between the center electrode and an inside wall of the outer electrode changes along the entire effective length of the electrodes. The resistance between both of the electrodes changes accordingly. Therefore, the fluid sensor can not detect the amount of oil with accuracy.

During operation of the engine, the oil in an oil pan is stirred to bubbling. If the distance between the electrodes is large because of a large draft taper, bubbles enter the space between the electrodes, which reduces the sensitivity of the sensor. Consequently, the sensor may determine that the oil pan is empty in spite of having sufficient oil. If the electrode distance is small, the oil adheres to the electrodes because of the viscosity of the oil. Thus, the amount of the oil can not be detected.

Since the die casting has a high surface roughness, it is necessary to finish the surface of the inside wall of the sensor body, which increases the manufacturing process and cost.

SUMMARY OF THE INVENTION

An object of the present invention is to provide an oil level sensor which is easily manufactured at a low manufacturing cost and which detects a level of oil in an oil pan with accuracy.

According to the present invention, there is provided an oil level sensor comprising, a cylindrical hollow sensor body made of conductive resin, an inner electrode guide made of insulating material and secured to an inner well of the sensor body, an elongated inner electrode securely mounted in the inner electrode guide so as to keep a predetermined distance from the inner wall of the sensor body, and means for electrically connecting the sensor body and the inner electrode with an outside unit.

In an aspect of the invention, the electrically connecting means comprises a shielded wire a lead wire of which is connected to the inner electrode, and a wire shield which is connected to the sensor body. The inner electrode may be made of conductive resin.

In another aspect, the inner electrode has a flange at a base portion thereof, and an insulator sleeve which is engaged in the sensor body, whereby the flange is held between the inner electrode guide and the insulator sleeve.

In a further aspect, a base end portion of the inner electrode is axially projected from the sensor body, an output connector is provided on the inner electrode, and the projected portion of the inner electrode is provided as a connector pin of the output connector.

The other objects and features of this invention will become understood from the following description with reference to the accompanying drawings.

BRIEF DESCRIPTION OF THE DRAWINGS

FIG. 5 is a sectional view showing a second embodiment;

FIG. 6 is a sectional view taken along a line VI—VI of FIG. 5;

FIG. 9 is a sectional view of the fourth embodiment; and

FIG. 10 is a side view of the fourth embodiment as viewed from the left of FIG. 9.

DETAILED DESCRIPTION OF THE PREFERRED EMBODIMENTS

Figure 1:
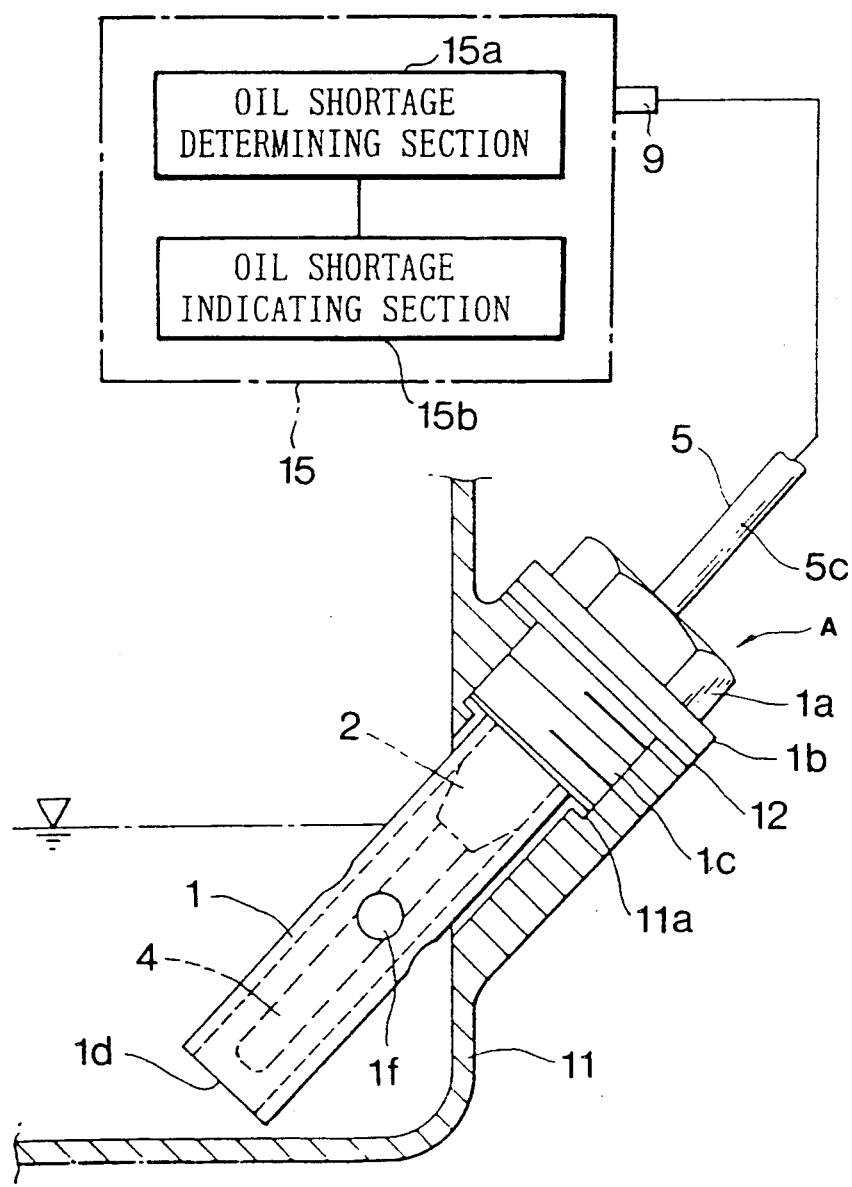
FIG. 1 is a schematic illustration of an oil level sensor according to the present invention, a part of which is shown in section.

Referring to FIG. 1, an oil level sensor A according to the present invention is provided in an oil pan 11 of an engine (not shown) by engaging a threaded opening 11a formed in the oil pan through a packing 12.

Figure 2:
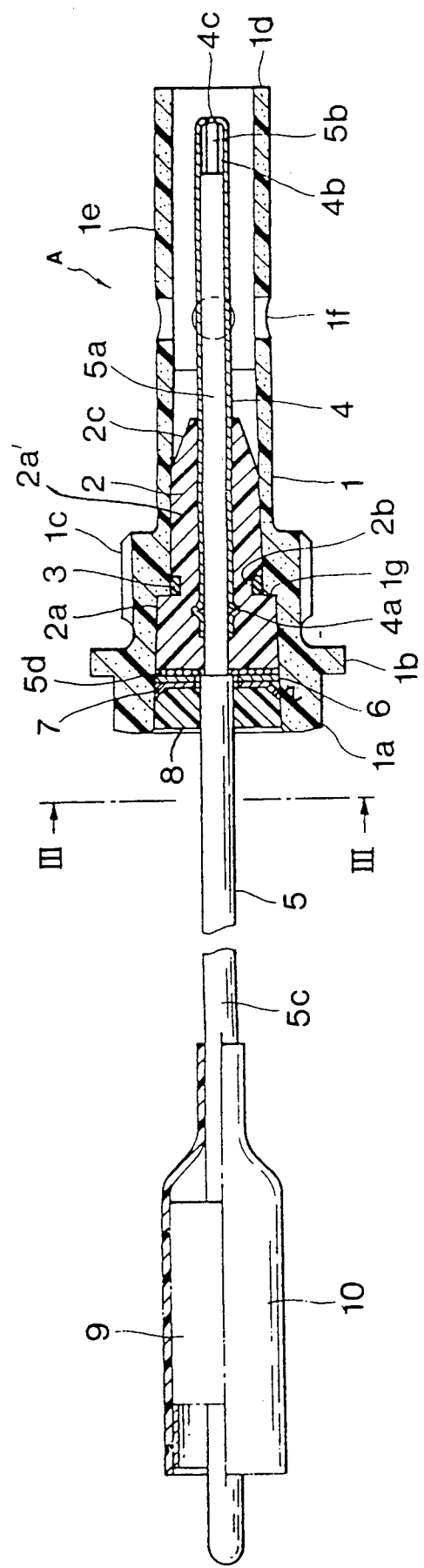
FIGS. 2 is a sectional view showing the oil level sensor.
Figure 3:
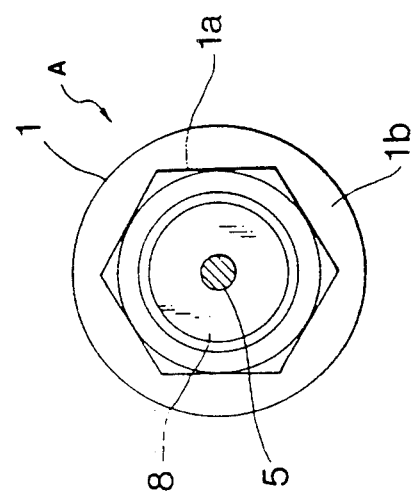
FIG. 3 is a sectional view of the oil level sensor taken along a line III—III of FIG. 2.

Referring to FIGS. 2 and 3, the oil sensor A has a cylindrical sensor body 1 served as an outer electrode, which is made of conductive resin including carbon particles molded by injection molding.

The sensor body 1 comprises a screw head 1a, a flange 1b adjacent to the screw head 1a and an outer thread 1c adjacent to the flange 1b. The sensor body 1 has a cylindrical hollow portion 1e and air vents 1f formed in the body 1 communicated with the hollow portion 1e. A stepwise portion 1g is formed on the inside wall of the sensor body 1.

In the hollow portion 1e, an inner electrode guide 2 is securely mounted. The guide 2 is made of a high-resistance insulation resin with heat-proofing. The guide 2 has a shoulder portion 2a engaged with the stepwise portion 1g of the sensor body 1, a cylindrical body portion 2a' and a taper portion 2c formed on an end of the cylindrical portion 2a'. The guide 2 has an axial hole formed along the axis, opening at both ends. An annular groove 2b is formed on the cylindrical body portion 2a' for engaging an O-ring 3.

The entire outer surface of the guide 2 or at least the outer surface of the taper portion 2c is coated with a material such as fluororesin having the heat-proofing, electrical resistivity and an oil repelling characteristic for preventing the oil from adhering to the guide 2.

A base portion of an inner electrode 4 made of an elongated metallic pipe is mounted in the guide 2 by directly molding the guide 2 on the inner electrode 4. The inner electrode 4 is engaged with the guide 2 by projections 4a formed on an end portion thereof. Thus, the inner electrode 4 is supported by the guide 2 along the axis of the hollow portion 1e of the sensor body 1.

An electric shielded wire 5 is provided for connecting the oil sensor A to an external control unit 15. The shielded wire 5 has an insulator coating 5a, a lead wire 5b and a wire shield 5c. The wire shield 5c in an end portion of the shielded wire 5 is removed to expose the coating 5a, and further an end portion of the coating 5a is removed to expose the lead wire 5b. The exposed portion of coating 5a is inserted into a hollow portion 4b of the inner electrode 4 and the exposed wire 5b is attached to the inner wall of the tip end of the inner electrode 4 and connected thereto by a solder injected through a small hole 4c formed in the tip end. The removed wire shield 5c is expanded and attached to the upper end surface of the guide 2 as a connecting wire shield 5d. An annular conductive washer 6 is mounted on the wire shield 5d and a conductive washer 7 having a bent flange is attached to the washer 6. The bent flange of the washer 7 enages with the inside wall of the sensor body 1. Thus, the wire shield 5d is electrically connected to the sensor body 1 through the flange of the washers 6 and 7.

An insulation cap 8 made of insulator such as epoxy resin is engaged in the sensor body 1 and pressed against the washer 7, thereby preventing the oil from entering the guide 2.

The shielded wire 5 is connected to a pin connector 9 which is connected to a control unit 15 (FIG. 1). The pin connector 9 is covered by a water-proof cover 10.

Referring to FIG. 1, the control unit 15 comprises an oil shortage determining section 15a for determining a predetermined low level of the oil in the oil pan 11 based on the resistance detected by the oil sensor A, and an oil shortage indicating section 15b for indicating the shortage of oil when the section 15a determines shortage of oil.

Describing the assembling of the oil sensor A, the inner electrode guide 2 is molded on the inner electrode 4. The heat-proof shielded wire 5 is connected to the pin connector 9 and the water-proof cover 10 is attached to the pin connector 9. The insulated wire 5a is striped by removing the shield wire 5c. The exposed insulator coating 5a is inserted into the hollow portion 4b of the inner electrode 4 passing through the axial hole of the guide 2. The lead wire 5b is attached to the end of the electrode 4. The tip end of the electrode 4 is vertically inserted into a solder tank to dip the end in the solder of the solder tank. The solder permeates in the hollow portion 4b of the electrode 4 passing through the hole 4c. Thus, the lead wire 5b is fixed to the bottom of the electrode 4 by the solder.

The O-ring 3 is engaged with the groove 2b of the guide 2, and the guide 2 integral with the inner electrode 4 is inserted into the hollow portion 1e of the sensor body 1 from the end having the screw head 1a. The stepwise portion 2a of the guide 2 abutted on the stepwise portion 1g of the sensor body 1 to position the guide 2 in the sensor body 1.

The wire shield 5d of the shielded wire 5 is mounted on the end of the guide 2 and the washers 6 and 7, and shielding cap 8 are inserted into the hollow portion 1e in order. The outer flange of the washer 7 tightly engages with the inside wall of the sensor body 1. The cap 8 seals the inside of the sensor body 1.

As shown in FIG. 1, the oil sensor A is inserted into the threaded opening 11a of the oil pan 11 and the outer thread 1c of the sensor body 1 is screwed in the threaded opening 11a, interposing the packing 12. Thus, the oil level sensor A is attached to the oil pan 11.

Describing the operation, when a key switch (not shown) of the engine is turned on to start the engine, the voltage across the inner electrode 4 and the sensor body 1 is applied to the oil shortage determining section 15a of the control unit 15, so that the oil level is detected.

During the operation of the engine, if the oil pan 11 is sufficiently filled with the oil, both the lower portions of the sensor body 1 and the inner electrode 4 are soaked in the oil of the oil pan 11. The sensor A detects the resistance of the oil between the sensor body 1 and the inner electrode 4.

If the oil level in the oil pan 11 lowers to expose the sensor body 1 from the oil, the resistance between the sensor body 1 and the inner electrode 4 becomes large, which is detected by the shortage determining section 15a of the control unit 15. Thus, the shortage of the oil is indicated by the indicating section 15b, or the engine is stopped by the shortage. Thus, engine trouble such as burning is prevented beforehand.

If the vertical position of the oil sensor A is set at a higher position, the shortage is indicated without stopping the engine.

In accordance with the present invention, since the sensor body 1 is made of conductive resin including carbon, the following advantages are obtained.

The resistance of the sensor body 1 is very small compared with the oil resistance. Accordingly, the resistance of the sensor body 1 has a value within a detecting error of the sensor. Since the sensor body 1 is made by molding conductive plastic, the sensor A is light, and it is possible to mold the sensor body 1 by the injection molding, thereby reducing the cost of the mold. Further, the draft taper can be very small. Thus, the distance between the inner electrode 4 and the inside wall of the sensor body 1 is uniformly provided at a small value. Since the resistance changes continuously with the oil level, the oil level is detected with accuracy. Because the surface roughness of the sensor body 1 is small, finishing the surface of the inside wall of the sensor body is not necessary. Strength of the sensor A is ensured because of carbon particles, thereby improving durability of the sensor A.

Figure 4:
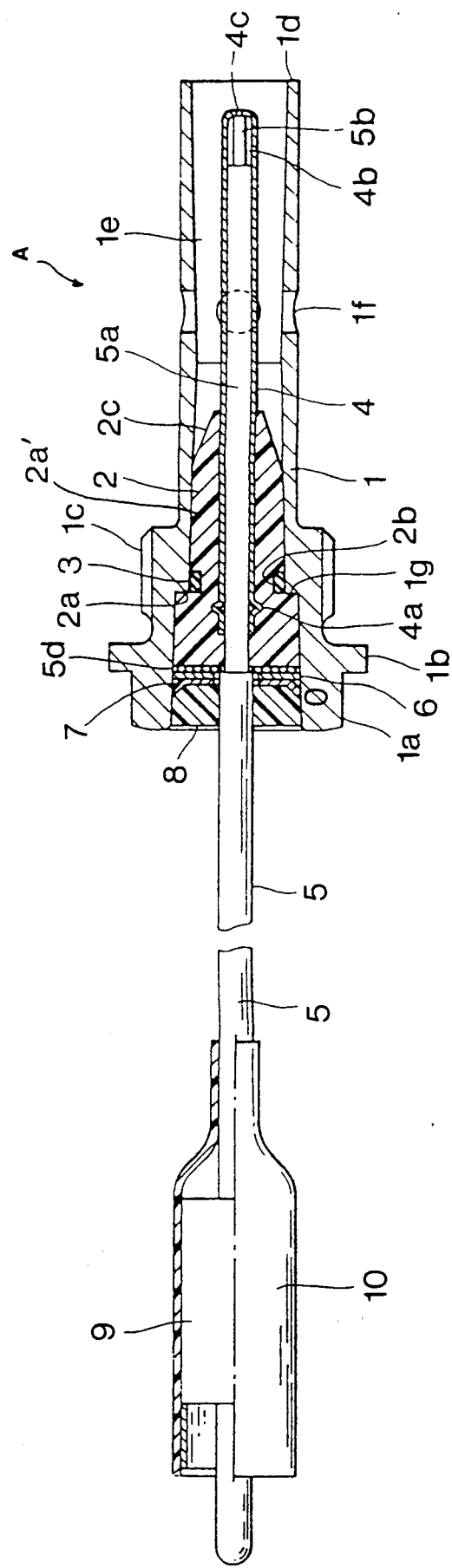
FIG. 4 shows a modification of the oil level sensor of FIG. 2.

FIG. 4 shows a modification of the first embodiment. In the modification, the sensor body 1 is made of metal. Other parts are the same as the first embodiment and hence the same parts are identified by the same reference as FIG. 2.

FIGS. 5 and 6 show the second embodiment of the present invention. The parts which are the same as the first embodiment are identified with the same reference numerals as FIGS. 1 to 3.

The guide 2 has a recess 2d on the shoulder portion 2a at a predetermined depth in the axial direction of the guide 2 and a groove 2e formed at the bottom of the recess 2d for engaging an O-ring 3b. An inner electrode 14 is made of conductive resin including the carbon particles and formed by injection molding. The inner electrode 14 is engaged in the axial hole of the guide 2 at an end portion thereof. The inner electrode 14 has a flange 14a provided on the axially inner upper end thereof to be engaged with the bottom of the recess 2d and a projecting portion 14b projected from the flange 14a in the recess 2d. The end portion of the flange 14a is sealed by the O-ring 3b. A lead wire 5b' projected from the end of the insulator coating 5a of the shielded wire 5 is mounted on the periphery of the projecting portion 14b and of the inner electrode 14, pressed against the periphery by a ring 16. An insulating washer 17 of rubber is engaged on the insulator coating 5a. The wire shield 5d expanded from the wire shield 5c is abutted on the washer 17 by the washers 6 and 7 in the same manner as the first embodiment.

During the operation of the engine, the oscillation of the engine is transmitted to the oil level sensor, causing the inner electrode 14 to oscillate. The guide 2 is inserted in the inner electrode 14. In the second embodiment, since the inner electrode 14 is made of the conductive resin, so that the weight of the inner electrode 14 is reduced compared with the first embodiment. Therefore, the guide 2 can be reduced in size, thereby further reducing the weight of the oil level sensor A.

Figure 7:
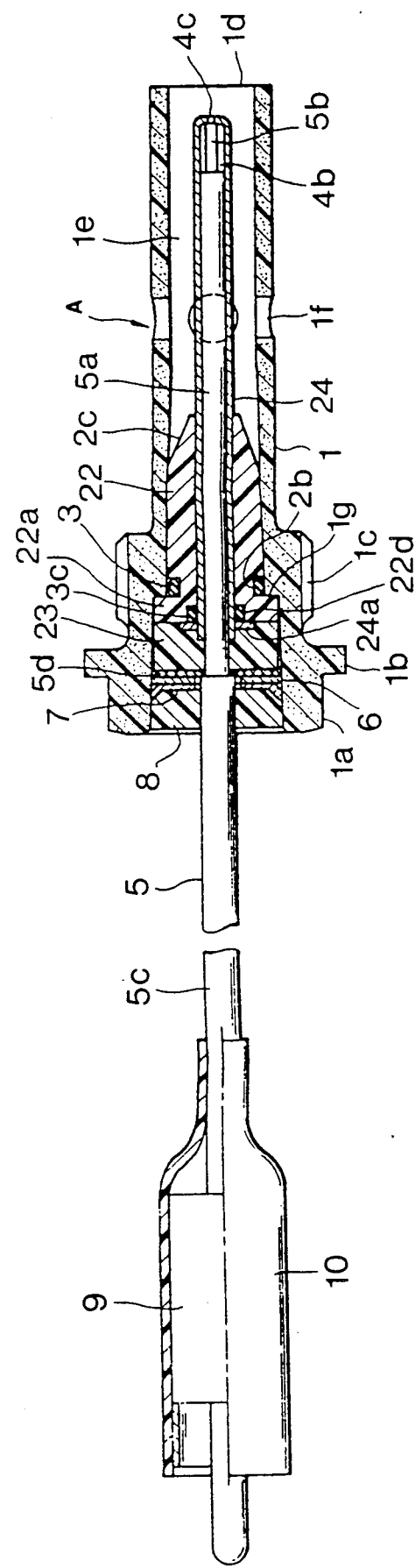
FIG. 7 is a sectional view showing a third embodiment.

Referring to FIG. 7 showing the third embodiment, an inner electrode guide 22 of insulator has a base flange portion 22a engaged with the stepwise portion 1g of the sensor body 1, and has a recess 22d formed on the end surface thereof for engaging an O-ring 3c. An inner electrode 24 mounted in the guide 22 has a flange 24a formed on an end portion thereof to be engaged with the flange portion 22a so as to prevent the inner electrode 24 from removing from the guide 22. An insulator sleeve 23 is engaged in the sensor body 1 for holding the end of the inner electrode 24. The wire shield 5d of the shielded wire 5 is attached on the insulator sleeve 23 to be electrically connected to the sensor body 1. Other structure is the same as the first embodiment.

In assembling, the washers 7 and 6 are engaged with the insulator coating 5a. The wire shield 5d is expanded on the insulator sleeve 23 mounted on the coating 5a. The O-rings 3 and 3c are inserted in the groove 2b and 22d, respectively. After the lead wire 5b of the shielded wire 5 is fixed to the bottom of the inner electrode 24 by soldering, he electrode 24 is mounted in the guide 22, thereby engaging the flange 24a with the flange portion 22a. The end portion of the sensor body 1 is sealed by engaging the insulation cap 8 in the hollow portion 1e.

Since the lead wire 5b is electrically separated from the wire shield 5d by means of the insulator sleeve 23, the insulation is sufficiently ensured.

If the inner electrode 24 is integral with the guide 22 for insulating the inner electrode 24 from the outer electrode as described in the first embodiment, the length of the inner electrode 24 can not be changed. Therefore, the oil level sensor A may not be used for another type of engine having a different depth of the oil pan.

In the third embodiment, since the insulator sleeve 23 is separately provided from the inner electrode guide 22, the length of the inner electrode 24 can be changed in accordance with the type of the engine. Therefore, the sensor body 1 and the other parts are commonly used for various types of the engine, thereby reducing the number of parts.

Figure 8:
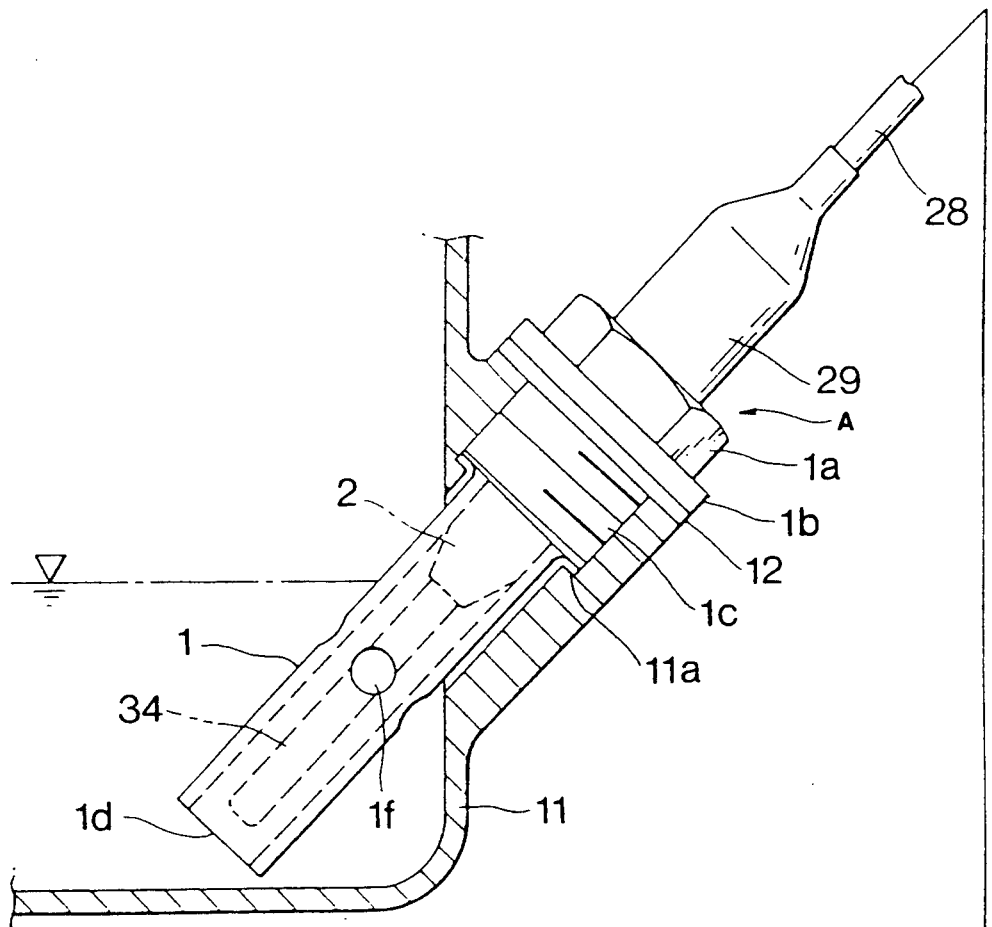
FIG. 8 is a schematic illustration showing a fourth embodiment.
Figure 8:
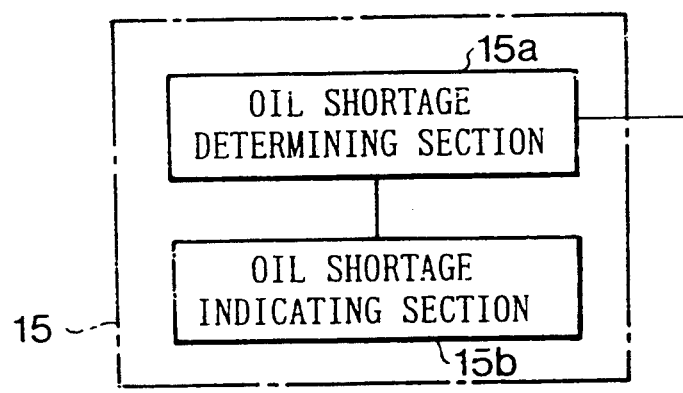

Referring to FIGS. 8 to 10 showing the fourth embodiment, an inner electrode 34 made of metal rod is mounted in the axial hole of the guide 2 and secured thereto by projections 34a projected from the electrode 34. A base end portion of the inner electrode 34 is projected from the guide 2 and a tip end 34b is disposed adjacent the end 1d of the sensor body 1. The base end portion of the electrode 34 is projected from the sensor body 1.

The projected portion serves as an output connector 25. The output connector 25 comprises a connector pin 25a, a high-resistance insulating member 25b mounted on the connector pin 25a in the sensor body 1, and a cylindrical connector 25c made of a metal pipe securely mounted on the insulating member 25b. The connector 25c has a flange 25d abutted on the end of the guide 2. An outer periphery of the flange 25d is further bent to be engaged with the inside wall of the sensor body 1. Thus, the sensor body 1 is electrically connected to the connector 25c through the flange 25d. An annular sealing cap 26 of a high-resistance insulator such as epoxy resin is mounted on the flange 25d. A gap 25e is formed between the connector 25c and the inside wall of the sensor body 1.

An input connector 27 is provided to be connected to the output connector 25. The input connector 27 comprises a plug 27a to be engaged with the connector pin 25a and a plug socket 27c to be engaged with the connector 25c.

A shielded wire 28 connected the control unit 15 is connected to the input connector 27. A lead wire and a wire shield of the shielded wire 28 are connected to the plug 27a and the plug socket 27c, respectively. A waterproof cover 29 is mounted on the input connector 27.

Other structure is the same as the first embodiment.

In the fourth embodiment, the input connector 27 having the shielded wire 28 is detachably attached to the output connector 25 which is integral with the sensor body 1. Thus, the number of parts of the oil level sensor are reduced and the manufacturing process for wiring is unnecessary, thereby improving the assembling efficiency of the manufacturing process.

While the presently preferred embodiments of the present invention have been shown and described, it is to be understood that these embodiments are for the purpose of illustration and that various changes and modifications may be made without departing from the scope of the invention as set forth in the appended claims.

What is claimed is:

1. An oil level sensor for detecting a level of fluid in a container, comprising:
   a cylindrical hollow sensor body made by injection molding of conductive, resin material;

an inner electrode guide made of an insulating material and secured to an inner wall of said cylindrical hollow sensor body;

an elongated inner electrode made of conductive, resin material and securely mounted in said inner electrode guide so as to be kept a predetermined distance from said inner wall of said cylindrical hollow sensor body;

means for electrically connecting said cylindrical hollow sensor body and said elongated inner electrode with control means for indicating shortage of said fluid; and wherein said electrically connecting means is a shielded wire comprising a lead wire connected with said elongated inner electrode and a wire shield connected with said cylindrical hollow sensor body; and said elongated inner electrode has a flange at a base portion thereof so as to be firmly secured in said inner electrode guide and an insulator sleeve plugged into said cylindrical hollow sensor body, whereby said flange is held between said inner electrode guide and said insulator sleeve.

2. The oil level sensor according to claim 1, wherein a base end portion of the inner electrode is axially projected from the sensor body, an output connector is provided on the inner electrode, the projected portion of the inner electrode is provided as a connector pin of the output connector.

3. An oil level for detecting a level of fluid in a container, comprising:

a cylindrical hollow sensor body made conductive by including carbon particles in resin;

an inner electrode guide made of an insulating material and secured to an inner wall of said cylindrical hollow sensor body;

an elongated inner electrode made conductive by including carbon particles in resin and securely mounted in said inner electrode guide so as to be kept a predetermined distance from said inner wall of said cylindrical hollow sensor body;

means for electrically connecting said cylindrical hollow sensor body and said elongated inner electrode with a control unit;

said control unit comprises electric detector means for detecting the level of the fluid based on resistance between the sensor body and the inner electrode and for indicating shortage of said fluid;

said electrically connecting means being a shielded wire comprising a lead wire connected with said elongated inner electrode and a wire shield connected with said cylindrical hollow sensor body; and said elongated inner electrode has a flange at a base portion thereof so as to be firmly secured in said inner electrode guide and an insulator sleeve plugged into said cylindrical hollow sensor body, whereby said flange is held between said inner electrode guide and said insulator sleeve.

* * * * *